United States Patent
Reichert et al.

(10) Patent No.: US 11,465,736 B2
(45) Date of Patent: Oct. 11, 2022

(54) MULTICOPTER WITH WIDE SPAN ROTOR CONFIGURATION AND PROTECTIVE FUSELAGE

(71) Applicant: Kitty Hawk Corporation, Palo Alto, CA (US)

(72) Inventors: Todd Reichert, Mountain View, CA (US); Cameron Robertson, San Mateo, CA (US); Mark Johnson Cutler, Sunnyvale, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 508 days.

(21) Appl. No.: 16/703,135

(22) Filed: Dec. 4, 2019

(65) Prior Publication Data
US 2020/0102071 A1    Apr. 2, 2020

Related U.S. Application Data

(63) Continuation of application No. 16/191,888, filed on Nov. 15, 2018, now Pat. No. 10,526,079, which is a continuation-in-part of application No. 16/107,518, filed on Aug. 21, 2018, now Pat. No. 10,427,782, which is a continuation of application No. 15/915,820, filed on Mar. 8, 2018, now Pat. No. 10,081,422, which is a continuation of application
(Continued)

(51) Int. Cl.
*B64C 27/08*    (2006.01)
*B64C 25/54*    (2006.01)
*B64C 27/00*    (2006.01)

(52) U.S. Cl.
CPC .............. *B64C 27/08* (2013.01); *B64C 25/54* (2013.01); *B64C 27/001* (2013.01)

(58) Field of Classification Search
CPC .............. B64C 27/08; B64C 2201/108; B64C 2201/072; B64C 2201/162; B64C 2201/165
USPC ....................................................... 244/17.23
See application file for complete search history.

(56) References Cited

U.S. PATENT DOCUMENTS

| | | | |
|---|---|---|---|
| 1,840,716 A | 1/1932 | Hitt | |
| 1,957,277 A | 5/1934 | Leray | |
| (Continued) | | | |

FOREIGN PATENT DOCUMENTS

| | | |
|---|---|---|
| CN | 104058092 | 9/2014 |
| CN | 104925263 | 9/2015 |
| (Continued) | | |

OTHER PUBLICATIONS

U.S. Appl. No. 15/249,077 entitled Multicopter With Wide Span Rotor Configuration, filed Aug. 26, 2016.
(Continued)

*Primary Examiner* — Christopher P Ellis
(74) *Attorney, Agent, or Firm* — Van Pelt, Yi & James LLP

(57) ABSTRACT

An inner middle rotor is rotated while an inner front rotor, an inner back rotor, and an outer rotor are not rotated. The inner middle rotor is surrounded by the inner front rotor, the inner back rotor, the outer rotor, and a fuselage. After rotating the inner middle rotor while not rotating the inner front rotor, the inner back rotor, and the outer rotor, the inner middle rotor, the inner front rotor, the inner back rotor, and the outer rotor are simultaneously rotated.

8 Claims, 8 Drawing Sheets

Related U.S. Application Data

No. 15/649,293, filed on Jul. 13, 2017, now Pat. No. 9,944,386.

(56) References Cited

U.S. PATENT DOCUMENTS

| | | | |
|---|---|---|---|
| 2,196,946 A | 4/1940 | Stone | |
| 2,465,193 A | 3/1949 | Boyle | |
| 2,702,171 A | 2/1955 | Katzenberger | |
| 3,507,466 A * | 4/1970 | Fleur | B64C 25/52 |
| | | | 244/105 |
| 3,532,067 A | 10/1970 | Baker | |
| 3,889,902 A | 6/1975 | Madet | |
| 4,165,059 A | 8/1979 | Summer | |
| 4,356,787 A | 11/1982 | Harley | |
| 4,799,629 A * | 1/1989 | Mori | A61N 5/06 |
| | | | 244/30 |
| 4,848,702 A | 7/1989 | Riggins | |
| 5,277,383 A | 1/1994 | Tormakhov | |
| 6,000,353 A | 12/1999 | De Leu | |
| 6,254,032 B1 | 7/2001 | Bucher | |
| 6,293,491 B1 | 9/2001 | Wobben | |
| 6,409,122 B1 | 6/2002 | Nicolai | |
| 6,446,910 B1 | 9/2002 | Knoll | |
| 6,592,073 B1 | 7/2003 | Meekins | |
| 7,159,817 B2 | 1/2007 | VanderMey | |
| 7,188,804 B1 | 3/2007 | Boetto | |
| 7,263,945 B2 | 9/2007 | Little | |
| 7,699,260 B2 | 4/2010 | Hughey | |
| 8,047,153 B2 | 11/2011 | Wood | |
| 8,152,577 B1 | 4/2012 | Mitlyng | |
| 9,321,529 B1 * | 4/2016 | Jones | B64C 27/08 |
| 9,457,900 B1 * | 10/2016 | Jones | B63B 22/00 |
| 9,821,906 B1 * | 11/2017 | Roop | B64C 27/50 |
| 9,856,016 B2 * | 1/2018 | Mueller | B64D 45/00 |
| 9,873,486 B2 | 1/2018 | Jackson | |
| 9,944,386 B1 | 4/2018 | Reichert | |
| 10,059,436 B1 | 8/2018 | Robertson | |
| 10,086,931 B2 | 10/2018 | Reichert | |
| 10,144,504 B1 * | 12/2018 | Selwa | G05G 1/01 |
| 10,526,079 B1 * | 1/2020 | Reichert | B64C 29/0025 |
| 10,669,037 B1 | 6/2020 | Kwon | |
| 2002/0125368 A1 * | 9/2002 | Phelps, III | B64C 27/10 |
| | | | 244/17.23 |
| 2003/0164424 A1 | 9/2003 | Smith | |
| 2006/0266881 A1 * | 11/2006 | Hughey | B64C 27/08 |
| | | | 244/17.23 |
| 2008/0302908 A1 | 12/2008 | Filipek | |
| 2009/0008499 A1 * | 1/2009 | Shaw | B64C 27/20 |
| | | | 244/17.23 |
| 2010/0032522 A1 | 2/2010 | Zadini | |
| 2010/0044506 A1 | 2/2010 | Smith | |
| 2010/0066158 A1 | 3/2010 | Hamilton | |
| 2011/0042509 A1 | 2/2011 | Bevirt | |
| 2011/0226892 A1 * | 9/2011 | Crowther | B64C 39/024 |
| | | | 244/17.23 |
| 2011/0248118 A1 | 10/2011 | Meekins | |
| 2012/0083945 A1 * | 4/2012 | Oakley | G05D 1/0858 |
| | | | 701/2 |
| 2013/0075538 A1 | 3/2013 | Wiplinger | |
| 2013/0105628 A1 * | 5/2013 | Buscher | B64C 39/024 |
| | | | 244/119 |
| 2013/0174768 A1 | 7/2013 | Von Der Goltz | |
| 2014/0252165 A1 | 9/2014 | Smith | |
| 2014/0261126 A1 | 9/2014 | Jenkins | |
| 2015/0012154 A1 * | 1/2015 | Senkel | B64C 27/20 |
| | | | 701/4 |
| 2015/0217862 A1 | 8/2015 | Dijaux | |
| 2015/0314831 A1 | 11/2015 | Jackson | |
| 2016/0032895 A1 * | 2/2016 | Weddendorf | F03D 3/02 |
| | | | 244/17.23 |
| 2016/0059958 A1 | 3/2016 | Kvitnevskiy | |
| 2016/0207368 A1 * | 7/2016 | Gaonjur | B64C 37/00 |
| 2016/0207625 A1 * | 7/2016 | Judas | B64C 3/38 |
| 2016/0244157 A1 | 8/2016 | Welsh | |
| 2016/0311526 A1 * | 10/2016 | Geise | B64C 27/52 |
| 2016/0375982 A1 * | 12/2016 | Rifenburgh | B64D 27/04 |
| | | | 244/17.19 |
| 2017/0043866 A1 | 2/2017 | Sakurai | |
| 2017/0106978 A1 | 4/2017 | Sopper | |
| 2017/0158342 A1 * | 6/2017 | Ishii | G05D 1/0072 |
| 2017/0174335 A1 * | 6/2017 | Malloy | B64C 39/026 |
| 2017/0183088 A1 * | 6/2017 | Du | B64C 27/08 |
| 2017/0197710 A1 * | 7/2017 | Ma | G08G 5/0026 |
| 2017/0199527 A1 * | 7/2017 | Chandra | G05D 1/0202 |
| 2017/0210486 A1 * | 7/2017 | O'Brien | G03B 7/02 |
| 2017/0247107 A1 * | 8/2017 | Hauer | B64D 35/06 |
| 2017/0247113 A1 * | 8/2017 | Sanlaville | B64C 39/024 |
| 2017/0253331 A1 * | 9/2017 | Nakashima | B64D 35/04 |
| 2017/0253333 A1 | 9/2017 | Baudet | |
| 2017/0269609 A1 * | 9/2017 | Bradlow | G05D 1/0661 |
| 2017/0283048 A1 * | 10/2017 | Beckman | B64C 39/024 |
| 2018/0002001 A1 | 1/2018 | Daniel, Sr. | |
| 2018/0057152 A1 | 3/2018 | Reichert | |
| 2018/0105267 A1 * | 4/2018 | Tighe | G05D 1/0858 |
| 2018/0117980 A1 | 5/2018 | Lacaze | |

FOREIGN PATENT DOCUMENTS

| | | | |
|---|---|---|---|
| CN | 105270614 | | 1/2016 |
| CN | 205131643 | | 4/2016 |
| CN | 108482639 A | * | 9/2018 |
| CN | 113212763 A | * | 8/2021 |
| DE | 202004010057 | | 8/2004 |
| DE | 102013014145 | | 5/2018 |
| JP | 2014227155 | | 12/2014 |
| KR | 20120102880 | | 9/2012 |
| WO | 2008147484 | | 12/2008 |
| WO | 2015092389 | | 6/2015 |
| WO | 2015145101 | | 10/2015 |

OTHER PUBLICATIONS https://www.gore.com/sites/g/files/ypyipe116/files/2016-04/GORE-Protective-Vents-Heavy-Duty-Equipment-Brochure_us.pdf.

Susan Chambers, "Vent To Prevent" https://www.slideshare.net/theilp/pls-2014-vent-to-prevent-how-pressure-equalization-prevents-premature-failure-of-outdoor-luminaires.

* cited by examiner

MULTICOPTER WITH WIDE SPAN ROTOR CONFIGURATION AND PROTECTIVE FUSELAGE

CROSS REFERENCE TO OTHER APPLICATIONS

This application is a continuation of U.S. patent application Ser. No. 16/191,888, entitled MULTICOPTER WITH WIDE SPAN ROTOR CONFIGURATION AND PROTECTIVE FUSELAGE filed Nov. 15, 2018 which is incorporated herein by reference for all purposes, which is a continuation in part of U.S. patent application Ser. No. 16/107,518, now U.S. Pat. No. 10,427,782, entitled MULTICOPTER WITH WIDE SPAN ROTOR CONFIGURATION AND PROTECTIVE FUSELAGE filed Aug. 21, 2018 which is incorporated herein by reference for all purposes, which is a continuation of U.S. patent application Ser. No. 15/915,820, now U.S. Pat. No. 10,081,422, entitled MULTICOPTER WITH WIDE SPAN ROTOR CONFIGURATION AND PROTECTIVE FUSELAGE filed Mar. 8, 2018 which is incorporated herein by reference for all purposes, which is a continuation of U.S. patent application Ser. No. 15/649,293, now U.S. Pat. No. 9,944,386, entitled MULTICOPTER WITH WIDE SPAN ROTOR CONFIGURATION AND PROTECTIVE FUSELAGE filed Jul. 13, 2017 which is incorporated herein by reference for all purposes.

BACKGROUND OF THE INVENTION

New types of aircraft, such as multicopters with unshielded rotors, are being developed. Some of these multicopters perform vertical takeoffs and landings which permit the multicopters to take off from non-traditional locations (e.g., they do not need to take off from airports). Although such multicopters are useful (e.g., because they can take off and/or land in airports as well as other locations), further improvements would be desirable. For example, safety measures and/or techniques to prevent the unshielded rotors from striking people and/or objects would be desirable. It would also be desirable if these safety measures and/or techniques are lightweight, since some multicopters have strict weight restrictions (e.g., ultralights).

BRIEF DESCRIPTION OF THE DRAWINGS

Various embodiments of the invention are disclosed in the following detailed description and the accompanying drawings.

DETAILED DESCRIPTION

Figure 1A:
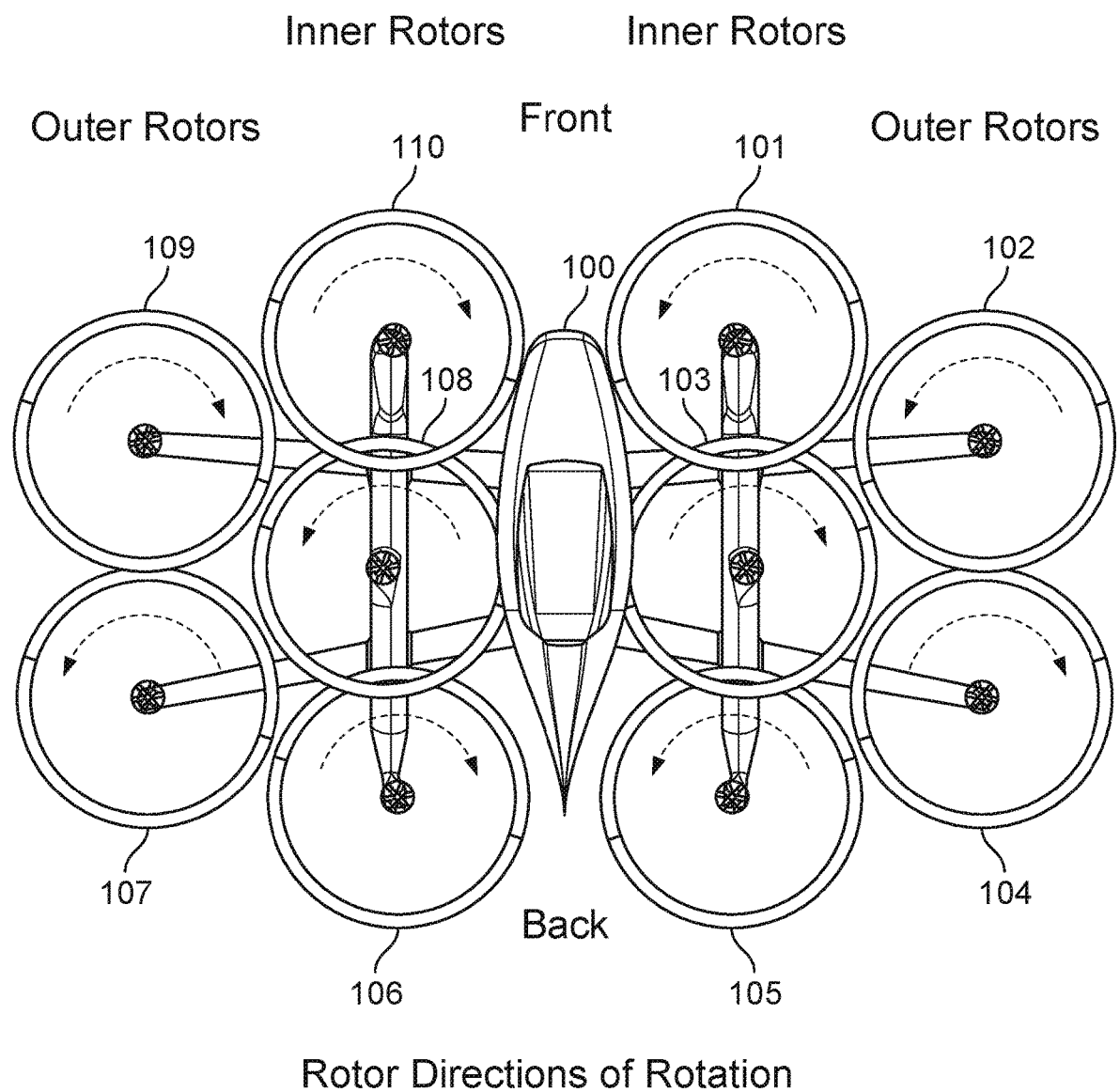
FIG. 1A is a diagram illustrating an embodiment of rotor directions of rotation in a multicopter.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a multicopter with a wide span rotor configuration and protective fuselage are described herein. In some embodiments, the aircraft includes a plurality of rotors (e.g., where the plurality of rotors are attached to the aircraft at a fixed roll angle and a fixed pitch angle, and the plurality of rotors rotate independently of one another) and a fuselage (e.g., which includes a side wall with a top edge, where the top edge of the side wall is higher than the plurality of rotors). In some figures below, an exemplary multicopter has 10 total rotors. To maneuver the aircraft, different torques are applied to the rotors, which causes the rotors to rotate at different speeds and/or output different thrusts. The height of the fuselage's side walls and/or the position of the rotors relative to the fuselage are designed to protect the pilot. For example, if one of the rotors were to break while rotating, the broken rotor parts would become fast-moving and dangerous projectiles. Since the top of the side wall is higher than the rotors, any rotor projectiles will hit the side wall of the fuselage and not the pilot.

FIG. 1A is a diagram illustrating an embodiment of rotor directions of rotation in a multicopter. In this example, a multicopter with 10 rotors is shown with 5 rotors each on the left (port) side and right (starboard) side of the multicopter. Inner rotors 101, 103, 105, 106, 108, and 110 are located adjacent to the fuselage (100). Outer rotors 102, 104, 107, and 109 are separated from the fuselage (100) by the inner rotors. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

In this example, the inner rotors (101, 103, 105, 106, 108, and 110) overlap with their neighboring or adjacent inner rotor(s). For example, inner rotor 106 overlaps with (and rotates above) inner rotor 108, which in turn overlaps with (and rotates above) inner rotor 110. Similarly, on the other side, inner rotor 105 overlaps with (and rotates above) inner rotor 103, which in turn overlaps with (and rotates above) inner rotor 101. As will be described in more detail below, to achieve the overlaps shown, the rotors are tilted at various angles and/or are placed at different heights in this example.

In some embodiments, having the inner rotors overlap with each other (one example of which is shown here) is attractive because it permits a smaller, more compact footprint of the multicopter than if the inner rotors did not overlap. A smaller footprint may be desirable because the multicopter takes up less space for transport or when parked, and/or a smaller safety zone is required when taking off or landing. Also, the weight can be reduced with a smaller airframe, which is desirable since less power is required to fly the aircraft and/or the range can be extended. The tradeoff with overlapping rotors is that they may interfere with each other aerodynamically (e.g., the airflow from one rotor interferes with another rotor) but this impact may be relatively small and/or acceptable given the benefits of a smaller footprint. For example, the overlap between inner rotors shown here is relatively small and so the interference may be negligible.

In some embodiments, a multicopter is sized so that it can fit into a trailer or on a flatbed and be towed. For example, because the wingspan is wider than the nose-to-tail length of the multicopter, the exemplary multicopter may be fit into an enclosed trailer or on an open flatbed trailer sideways. By having the inner rotors overlap, this makes it easier to fit the multicopter into standard sized trailers.

Using 10 rotors as shown here may be attractive for a variety of reasons. For example, 10 rotors maximizes the multicopter's disc area within a desired overall size (e.g., the desire to fit the multicopter into or on a standard-width trailer). Using 10 rotors also helps with redundancy because it permits the multicopter to maintain flight and possibly allow for some degree of flight precision even if there is rotor failure. It is noted that a rotor failure may require power to be cut to a rotor opposite to the failed rotor for symmetry and ease of flight.

In this example, the outer rotors do not overlap with their adjacent or neighboring inner rotors. For example, outer rotor 109 (102) does not overlap with inner rotor 110 (101) nor with inner rotor 108 (103). Similarly, outer rotor 107 (104) does not overlap with inner rotor 108 (103) nor with inner rotor 106 (105). However, the outer rotors do overlap with each other (e.g., outer rotor 109 (102) overlaps with outer rotor 107 (104)). Having some separation between an outer rotor and adjacent inner rotors (i.e., no overlap) may be desirable because the outer rotors are more susceptible to larger vibrations and/or bouncing. For example, because the outer rotors are located at the distal ends of the arms which extend outward from the fuselage, the outer rotors will vibrate or bounce up and down more than the inner rotors will. The inner rotors are also mounted to the floats (e.g., which run from front to back) which further dampens any vibrations or bouncing, whereas the outer rotors are not mounted to the floats. This larger vertical displacement of the outer rotors could cause an inner rotor and outer rotor to collide which could damage the rotors. To avoid this, there is no overlap between the outer rotors and the inner rotors in this configuration. Although not shown here, in some embodiments, the two outer rotors on a given side (e.g., rotor 107 and rotor 109, or rotor 102 and rotor 104) do not overlap for this reason (e.g., to avoid a potential collision).

The position or placement of the outer rotors is selected so that the outer rotors are packed fairly efficiently and/or tightly next to the two adjacent inner rotors. For example, outer rotor 109 sits in the "V" created by inner rotor 110 and inner rotor 108. This arrangement packs the rotors in an efficient and/or tight manner which in turn reduces the footprint of the multicopter.

This diagram also illustrates the directions of rotation of the various rotors. In this example, rotors 103, 104, 106, 109, and 110 rotate in a clockwise direction when viewed from above. Rotors 101, 102, 105, 107, and 108 rotate in a counterclockwise direction when viewed from above. Or, to put it another way, rotors 101, 102, 105, 106, 109, and 110 rotate towards the fuselage and rotors 103, 104, 107, and 108 rotate away from the fuselage.

It is noted that all of the rotors in a particular column (e.g., going from the front of the multicopter to the rear of the multicopter) have alternating directions of rotation. For example, in the leftmost column shown, rotor 109 and rotor 107 have alternating directions of rotation. Similarly, in the second column from the left, rotor 110 rotates in a clockwise direction, rotor 108 rotates in a counterclockwise direction, and rotor 106 rotates in a clockwise direction. This alternation of may enable the multicopter to fly more efficiently. A rotor creates lift when the blade is traveling against the direction of wind and does not create lift when it spins in the direction of wind. By stacking up alternating rotors one behind the next in the direction of flight (e.g., typically forwards), the multicopter may experience a consistent amount of lift and/or decrease intervals of decreased lift.

TABLE 1

Directions of rotation for the exemplary rotors shown in FIG. 1A.

| Rotor | Direction of Rotation (viewed from above) |
| --- | --- |
| Right Inner Front Rotor (101) | Counterclockwise |
| Right Outer Front Rotor (102) | Counterclockwise |
| Right Inner Middle Rotor (103) | Clockwise |
| Right Outer Back Rotor (104) | Clockwise |
| Right Inner Back Rotor (105) | Counterclockwise |
| Left Inner Back Rotor (106) | Clockwise |
| Left Outer Back Rotor (107) | Counterclockwise |
| Left Inner Middle Rotor (108) | Counterclockwise |
| Left Outer Front Rotor (109) | Clockwise |
| Left Inner Front Rotor (110) | Clockwise |

The directions of rotations shown here are selected based on a variety of factors. In some embodiments, rotors that are opposite to each other on the aircraft (e.g., where fuselage 100 acts as an axis of symmetry) may rotate in opposing directions to balance torque. For example, rotor 101 and rotor 110 are opposite to each other and rotate in opposite directions to counter the other's torque.

To illustrate the area occupied by the rotors when the rotors are on, the rotors are shown here as a circle and the number of blades is not shown. In some embodiments, a rotor has two blades and the rotors have a diameter of ~50 inches. A diameter of this size may correspond to the largest diameter possible for a 10 rotor configuration within the constraints of the desired multicopter dimensions (e.g., fit into a standard sized trailer).

It may be helpful to describe how the exemplary multicopter can be flown, beginning with how the pilot gets into the multicopter. In some cases, the multicopter will be floating on water and the pilot will get into the seat in the fuselage by walking on the arms, floats, and/or fuselage of the multicopter as needed. The rotors will be off at this time, and the pilot will be in no danger from the rotors when getting into the multicopter.

Figure 1B:
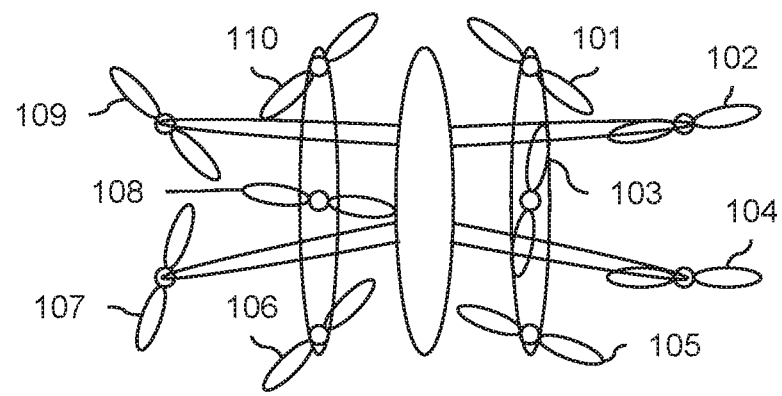
FIG. 1B is a diagram illustrating an embodiment where all of the rotors are initially off.
Figure 1C:
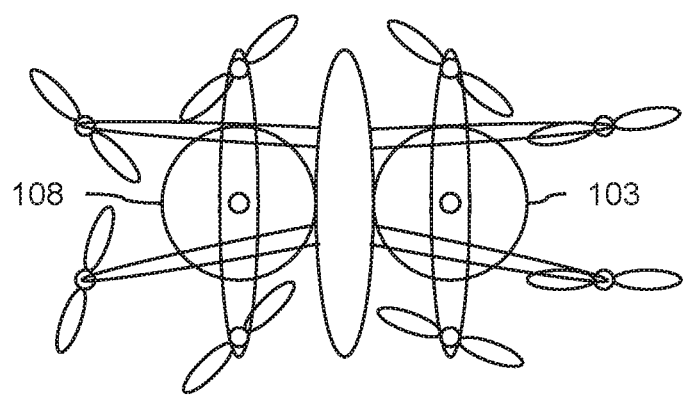
FIG. 1C is a diagram illustrating an embodiment where only the inner middle rotors are rotating while the rest of the rotors are not rotating.
Figure 1D:
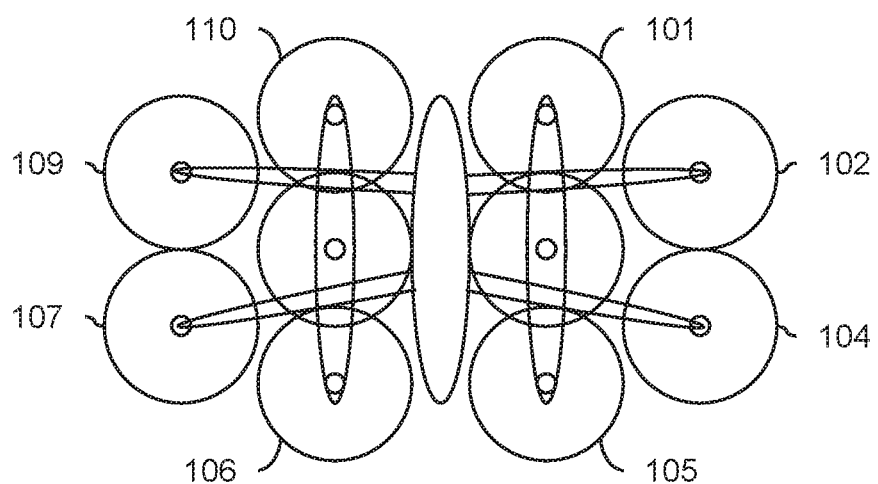
FIG. 1D is a diagram illustrating an embodiment where all of the rotors are rotating.

Once in the multicopter, the pilot may decide to steer (e.g., while floating on the water) the multicopter away from the boarding point to some takeoff location away from bystanders and/or other multicopters. In some embodiments, to do this, only the inner middle rotors are turned on and used to maneuver the multicopter to the desired takeoff location. For example, since rotor 103 and rotor 108 are shielded by other rotors, it will be harder for those rotors to hit any bystanders even if they are on. In some embodiments, only rotors 103 and 108 (i.e., the unexposed rotors) are used to maneuver the multicopter around to protect bystanders. See, for example, FIG. 1B where all of the rotors (101-110) are initially off. Then, in FIG. 1C, only the inner middle rotors (103 and 108) are rotating while the rest of the rotors (101-102, 104-107, and 109-110) are not rotating. Finally, in FIG. 1D, all of the rotors (101-110) are rotating. The following figure describes this sequence more generally and/or formally in a flowchart. Alternatively, the outer rotors (102, 104, 107, and 109) may be turned off and only the inner rotors (101, 103, 105, 106, 108, and 110) are used in some embodiments to maneuver the aircraft when on the water. Although this may pose more of a risk, it may be easier and/or more efficient to maneuver the aircraft using more rotors. In some embodiments, a multicopter has wheels and the multicopter is able to maneuver on the ground in this manner (e.g., using only shielded rotors or the inner rotors for safety).

Figure 1E:
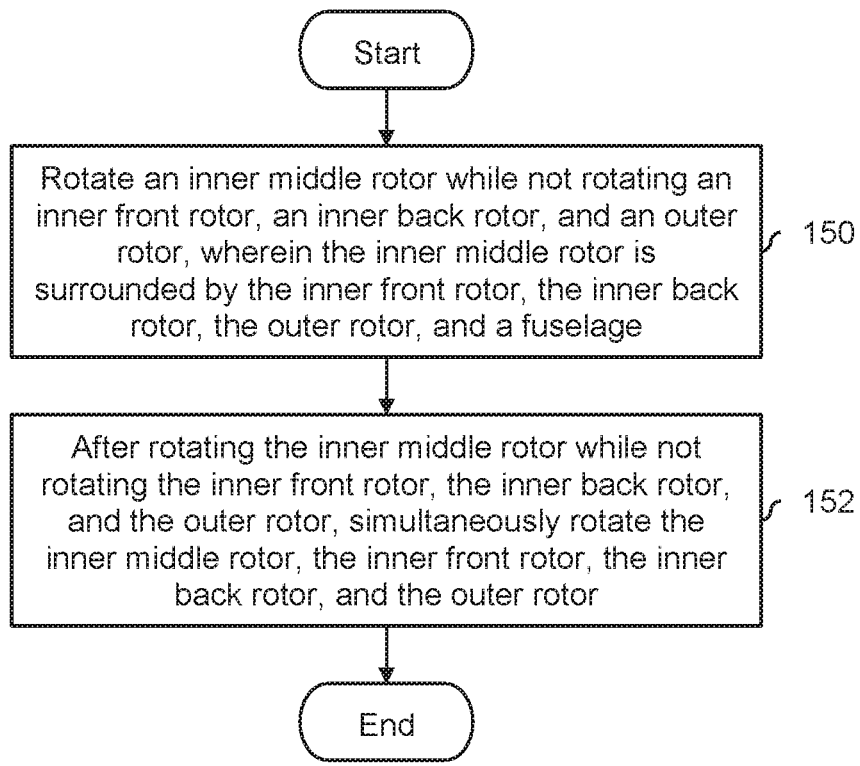
FIG. 1E is a flowchart illustrating an embodiment of a process to turn on rotors.

FIG. 1E is a flowchart illustrating an embodiment of a process to turn on rotors. In some embodiments, the process is performed by a flight computer and/or flight controller. In some embodiments, the process is performed when the rotors are turned on, prior to takeoff.

At 150, an inner middle rotor is rotated while an inner front rotor, an inner back rotor, and an outer rotor are not rotated, wherein the inner middle rotor is surrounded by the inner front rotor, the inner back rotor, the outer rotor, and a fuselage. See, for example, FIG. 1C. As described above, starting up the inner middle rotors first is safer since they are shielded by the fuselage and the other rotors which surround the inner middle rotors. For example, a person standing next to one of the edge or exterior rotors may hear the inner middle rotors start rotating but because the edge or exterior rotors are not rotating, that person would not be struck.

At 152, after rotating the inner middle rotor while not rotating the inner front rotor, the inner back rotor, and the outer rotor, the inner middle rotor, the inner front rotor, the inner back rotor, and the outer rotor are simultaneously rotated. See, for example, FIG. 1D. To continue the example from above, the person standing next to the edge or exterior rotor would hear the inner middle rotors begin rotating at 150 and will naturally move away from the multicopter. After some delay, all of the rotors begin rotating at 152, but by then the person has moved away from the multicopter and will not be struck when the edge or exterior rotor begins rotating.

A benefit to this technique is that it is lightweight (e.g., it does not require any new or additional parts, such as shields or guards around the rotors). This is especially desirable for vehicles with strict weight restrictions (e.g., ultralights).

In some embodiments, the inner middle rotors, which are the only rotors rotating at step 150, are used to maneuver the multicopter around (e.g., away from a dock on water or on land using wheels). Alternatively, the multicopter may be stationary on the ground (i.e., at step 150, the inner middle rotor(s) is/are not used to move the multicopter around) and waits for the other rotors to begin rotating (e.g., at step 152) so that it can perform a vertical takeoff.

Returning to FIG. 1A, once the multicopter reaches the desired takeoff location, the multicopter performs a substantially vertical takeoff. Once a desired altitude is reached, the pilot may rotate (e.g., while hovering at the same altitude) the multicopter about a vertical or yaw axis (not shown here) so that the multicopter is facing or pointing in some desired direction (e.g., toward a desired destination). The multicopter then flies forward, maintaining a constant altitude until the multicopter approaches a desired landing site (e.g., over water or on land). The pilot may slow the forward movement of the multicopter, coming to a forward stop generally above the desired landing site while still hovering and maintaining a constant altitude. The multicopter then descends vertically. If needed, the pilot may stop the vertical descent and (if desired) move the multicopter laterally left or right (e.g., while maintaining a constant altitude) in order to avoid objects on the ground and/or to better align the multicopter over the desired landing site. Similarly, during the vertical landing, the pilot may stop the vertical descent and (if desired) rotate the multicopter about vertical or yaw axis so that the multicopter is facing in some desired direction and/or to make it easier to shift left or right in order to land on the desired landing site.

Each of the rotors is attached in a fixed manner to the exemplary multicopter with some fixed roll angle and fixed pitch angle. The following figure shows an example of this.

Figure 2:
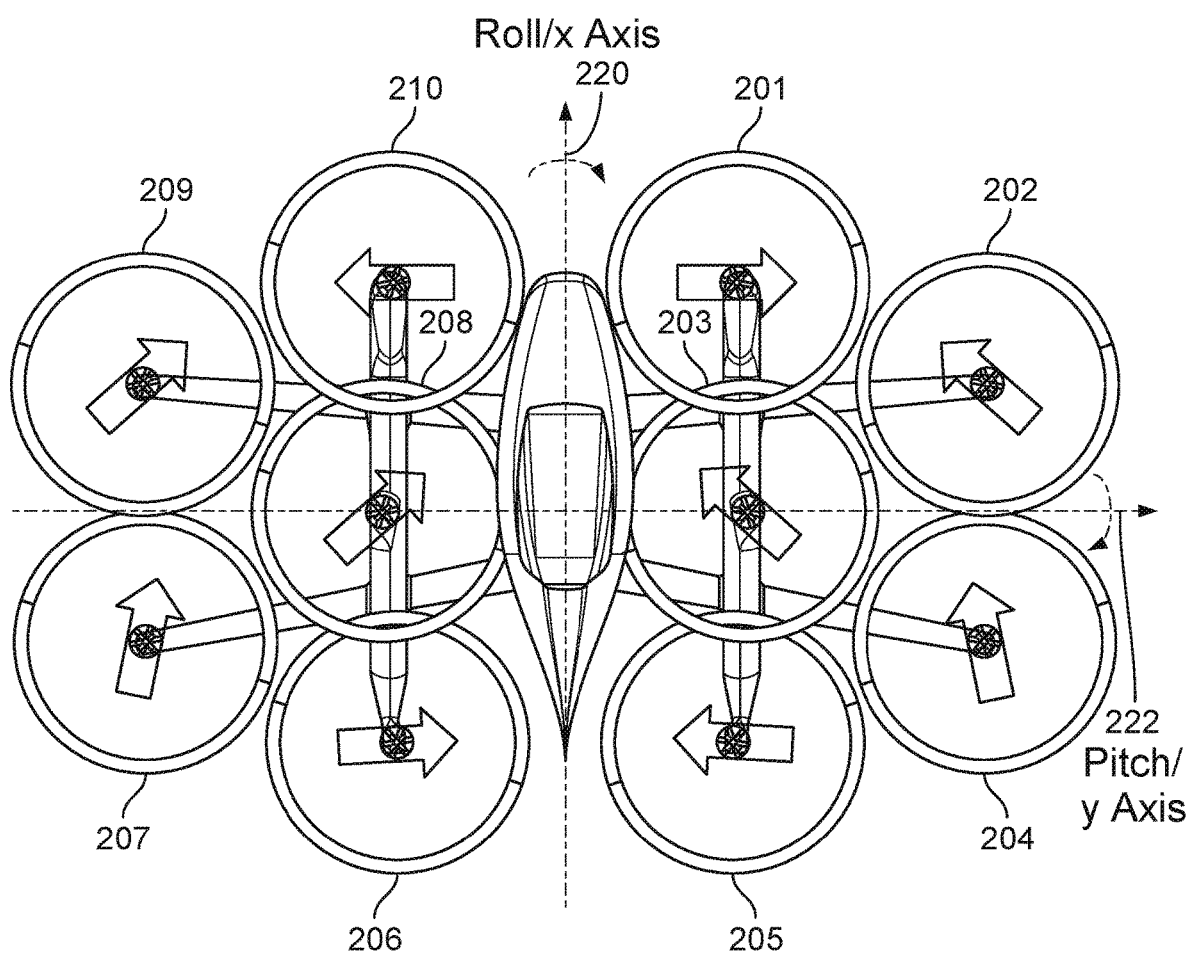
FIG. 2 is a diagram illustrating an embodiment of the fixed tilt positions of the rotors in a multicopter.

FIG. 2 is a diagram illustrating an embodiment of the fixed tilt positions of the rotors in a multicopter. In this example, each rotor's tilt position is described using two angles: a roll angle and a pitch angle. The roll angle is defined by the roll axis (220), sometimes referred to as an x-axis, where a positive roll angle follows the right-hand direction of rotation (see, for example, the curved arrow about roll axis 220) and a negative roll angle is in the opposite direction. Similarly, the pitch angle for each rotor is defined by the pitch axis (222), sometimes referred to as a y-axis, where a positive pitch angle follows the right-hand direction of rotation (see, for example, the curved arrow about pitch axis 222) and a negative pitch angle is in the opposite direction.

The following table lists the roll angle and pitch angle for each rotor in this example. It is noted that opposite rotors (e.g., where the fuselage acts as an axis of symmetry) have roll angles of the same magnitude but opposite signs (e.g., rotor 110 has a roll angle of −3° and rotor 101 has a roll angle of 3°) and the same pitch angle (e.g., both rotor 110 and rotor 101 have pitch angles of 0°). Generally speaking, the roll angles and pitch angles have magnitudes within the range of 0 degrees and 10 degrees.

TABLE 2

Tilt positions for the exemplary rotors shown in FIG. 2.

| Rotor | Roll Angle (in degrees) | Pitch Angle (in degrees) |
|---|---|---|
| Right Inner Front Rotor (201) | 3.0 | 0.0 |
| Right Outer Front Rotor (202) | −2.0 | −3.0 |
| Right Inner Middle Rotor (203) | −4.0 | −9.0 |
| Right Outer Back Rotor (204) | −2.0 | −10.0 |
| Right Inner Back Rotor (205) | −7.0 | −2.0 |
| Left Inner Back Rotor (206) | 7.0 | −2.0 |
| Left Outer Back Rotor (207) | 2.0 | −10.0 |
| Left Inner Middle Rotor (208) | 4.0 | −9.0 |
| Left Outer Front Rotor (209) | 2.0 | −3.0 |
| Left Inner Front Rotor (210) | −3.0 | 0.0 |

For convenience, an arrow is shown over each rotor which gives a general or rough sense of each rotor's tilt position For example, if each rotor is conceptually thought of as a plane, a hypothetical ball placed on that plane would roll (e.g., generally or roughly) in the direction of the arrow shown. In general, all of the rotors are tilted slightly forward, with the inner middle rotors (203 and 208) more so.

There are a number of benefits associated with the tilt positions shown in this example. First, all of the rotors have a slight (e.g., ~5 degrees) forward bias so that when the aircraft is flying forwards, the body of the aircraft remains level. Also, the tilt positions of the rotors angles are selected to maximize the aircraft's ability to yaw while minimizing the impact of losing any single rotor. The more a rotor is tilted, the more it contributes to yawing the vehicle when it is sped up or down.

The rotors are mounted to the multicopter (e.g., more specifically, to the floats for the inner rotors and to the arms for the outer rotors) in a fixed manner at the roll angles and pitch angles shown in a fixed manner. In other words, the rotors cannot change their tilt positions from the positions shown. To maneuver, each rotor is independently controllable (e.g., different amounts of torque can be applied to each rotor), such that each rotor can rotate at a different speed or output a different amount of thrust.

The various tilt positions shown here enable the multicopter to maneuver more efficiently compared to some other multicopter designs. For example, consider another multicopter where the rotors only tilt forward or backward to some degree (i.e., all of the rotors have a roll angle of 0°). To move sideways (e.g., left or right), such a multicopter may have to expend more power because none of the rotors have a non-zero roll angle which would help to move the multicopter laterally to the left or right. In contrast, the multicopter shown here can move sideways in a more efficient manner because the rotors have non-zero roll angles. For example, to move laterally to the right, more torque would be applied to rotors 206-209, which would create a thrust differential and move the multicopter to the right. Since rotors 206-209 have positive roll angles (e.g., the tops of those rotors are tilted inward toward the fuselage), some of their overall thrust becomes lateral thrust and some becomes vertical thrust. That is, the positive roll angles of rotors 206-209 more efficiently generate lateral thrust and movement to the right compared to rotors with roll angles of 0.

The following figure shows front and side views of the exemplary multicopter and discusses some landing and safety features.

Figure 3:
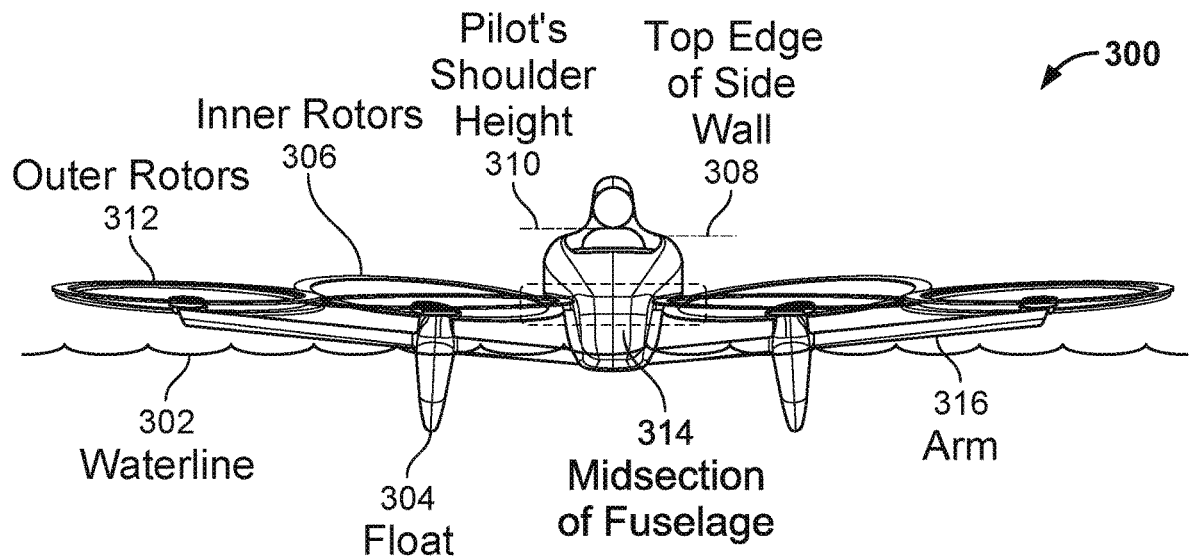
FIG. 3 is a diagram illustrating a front view and a side view of a multicopter embodiment.
Figure 3:
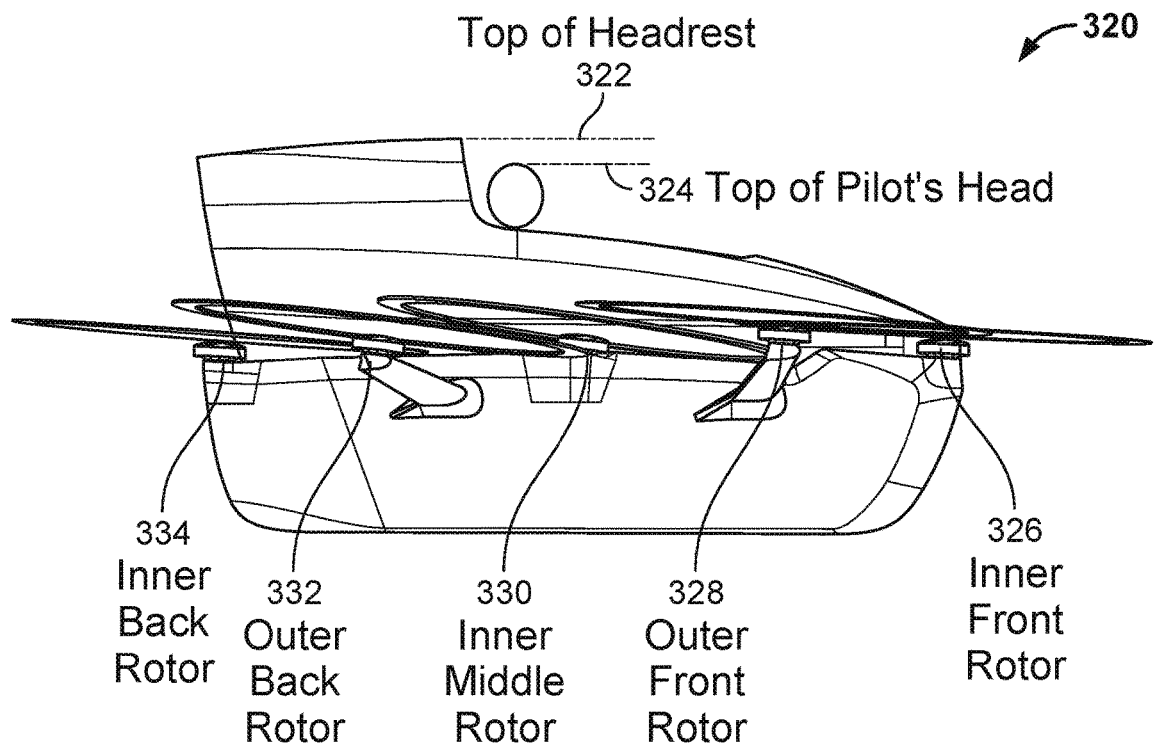

FIG. 3 is a diagram illustrating a front view and a side view of a multicopter embodiment. In the example shown, diagram 300 shows a front view of the exemplary multicopter. This multicopter is capable of taking off and landing on a variety of surfaces, including water and land (not shown here). Waterline 302 shows an example of how high the water is expected to come up to on the multicopter when the multicopter is floating on the surface of the water (e.g., with the rotors off).

From the front view shown in diagram 300, floats (304) are visible. The floats serve a number of functions or purposes. One function they serve is to displace water which generates buoyancy and enables the multicopter to float (e.g., when the rotors are off and are not providing lift). The inner rotors (306) are mounted to the top of the floats (304). Structurally, this helps to stabilize the inner rotors (e.g., since the float is more substantial than the arms to which the outer rotors (312) are attached) and reduces vibrations and/or bouncing experienced by the inner rotors. As will be described in more detail below, the floats are also used to store the batteries which power the rotors.

The dimensions of the float in this example are dictated and/or set in order to satisfy various design goals and/or objectives. As diagram 300 shows, from the front view, the floats look like air foils where the floats (e.g., observed from the front) are relatively narrow. This reduces drag when the multicopter is flying forwards. Also, because the inner rotors are mounted to the floats, there is a significant amount of downdraft from the inner rotors on the floats, so the floats also act as airfoils when viewed from above. The relatively thin width of the floats minimizes the downward force on the multicopter from the inner rotors' downdraft.

The length (e.g., from front to back) of the floats is dictated by the diameter of the 3 inner rotors and the amount of overlap between the inner rotors in this example. That is, the length of the float is roughly the shortest length which can fit the 3 inner rotors with the desired amount of overlap and not substantially more than that.

Since the floats also have to displace enough water to provide sufficient buoyancy for the multicopter to float, the remaining dimension (in this case, the height of the floats) is selected to enable that. To put it another way, since drag and downdraft considerations substantially limit the width of the floats and the length of the floats is substantially dictated by the diameter and packing of the inner rotors, that only leaves the height of the rotors which can be adjusted or otherwise set to provide sufficient buoyancy. It is noted that in this example, part of the fuselage is submerged when the aircraft is floating so that the floats do not need to provide all of the necessary buoyancy for the aircraft to float; this is accounted for in the selection of the float height.

In some embodiments, the floats are filled with air (e.g., in addition to any batteries or other components which are located in the floats) to help with buoyancy. In some embodiments, the floats have bottoms made of a thick and/or robust material so that the multicopter can be land on rough terrain or surfaces other than water. In some embodiments, the bottoms of the floats are curved. This may be desirable for water landings because it increases stability during water landings.

The front view shown in diagram 300 also illustrates a number of safety features associated with the fuselage. First, with respect to the pilot, the top edge of the fuselage's side wall (308) is at substantially the same height as the pilot's shoulder (310) when the pilot is seated. The high side walls (e.g., relative to the pilot's seated position) helps to protect the pilot's arms when the rotors of the multicopter are rotating and the pilot is seated. To touch the spinning inner rotors, the pilot's arms would have to go over the side wall, and even very long limbed people will not be able to touch the inner rotors while seated due to the tall side walls. In contrast, if the side walls were lower (e.g., at waist or stomach height), it would be easier for a pilot to reach over and touch a spinning inner rotor.

Another safety feature of the fuselage relates to the position and/or shape of the fuselage, relative to the rotors. If a rotor were to break into pieces while rotating (e.g., turning the rotor pieces into projectiles), the projectiles can actually project at a non-zero angle, causing the debris to leave the plane of rotation. In this example, the side wall's height is selected to accommodate for this, for example based on testing to determine a range of angles (e.g., from the plane of rotation) any projectiles are likely to be projected at if a rotor were damaged. For example, based on testing and/or simulation, heavier and faster moving particles do not tend to go more than ±5 degrees from the plan of rotation when they break apart. This means that the exposed part of the pilot (e.g., above the top edge of the side walls) should not be near the rotors' plane(s) of rotation plus some angle of projection. For this reason, a tall side wall is again useful.

The fuselage is also elevated relative to the rotors to further separate the top edge of the side wall (308) from the plane(s) in which the rotors rotate. With the multicopter configuration shown here, a rotor projectile would hit the fuselage near the midsection of the fuselage (314), not near the top edge of the side wall (308) where the pilot is exposed. In some embodiments, the midsection of the fuselage (e.g., where a projectile from a broken rotor might hit) is reinforced or otherwise designed to protect the pilot should a blade or rotor strike the fuselage.

Returning briefly to the tilt positions shown in Table 2, at least some of the rotors are also tilted in a way that reduces the likelihood of a pilot getting struck by a broken rotor. Note that almost all of the rotors (e.g., except for rotors 201 and 210) have roll angle signs (e.g., positive or negative) which mean that the rotors are mounted such that the top of each rotor tilts inward toward the fuselage. Returning to diagram 300 in FIG. 3, this means a rotor projectile rotor would go downward (e.g., away from the pilot) as opposed to upward (e.g., toward the pilot). Thus, the tilt positions of at least some of the rotors also help to protect the pilot.

Returning to diagram 320 in FIG. 3, the elevated position of the fuselage (e.g., where the bottom of the fuselage is connected to the arms (316) of the multicopter) may also be desirable because of the separation between the bottom of the fuselage and the ground. This separation between the fuselage and the ground permits the multicopter to land on uneven and/or rocky ground where a rock or protrusion might otherwise damage a lower-hanging fuselage.

At the midsection (314), the fuselage narrows inward (e.g., the side wall includes a top panel which runs vertically, a middle panel which runs (e.g., inwards) horizontally, and a bottom panel which runs vertically) so that the bottom portion of the fuselage is narrower than the top portion of the fuselage. The wider top enables the pilot to more easily enter and exit the multicopter and more comfortably sit in the multicopter. For example, although not shown here, the inside of the fuselage may have arm rests. These arm rests may be located above and/or formed by the narrowing of the fuselage at the midsection (314).

The narrower bottom of the fuselage permits the inner rotors to be closer to the center of the multicopter, which reduces the span (width) of the multicopter. Note, for example, that the narrowing of the fuselage at the midsection (314) creates an overhang beneath which the tips of the inner rotors (306) spin. This permits the rotors to be squeezed in more tightly and for the span (width) of the multicopter to be smaller than if the fuselage were the same width from top to bottom. The narrowing shape also has weight advantages.

Although not shown here, in some embodiments, the seat of a multicopter includes a seatbelt for strapping in a pilot (e.g., in a recumbent and/or seated position). When the rotors are spinning, the seatbelt may help to prevent the pilot from touching the spinning rotors. Also, during a crash or rollover, a seatbelt may keep the pilot safer.

Diagram 320 shows a side view of the multicopter. As shown here, the top of the headrest (322) is higher than the top of the pilot's head (324) when the pilot is seated. The headrest is protective and reinforced so that if the multicopter flips and/or rolls, the headrest protects the pilot's head from being crushed. In some embodiments, the headrest is reinforced by being part of a roll cage or other protective frame which extends throughout the fuselage to prevent the fuselage from collapsing inward and crushing additional body parts, such as the pilot's arms, torso, and legs.

The side view shown in diagram 320 also illustrates the different rotor heights (which generally speaking are within the range of 45 cm-55 cm off the ground) which help to achieve (e.g., in combination with the various tilt positions of the rotors) the rotor overlaps shown in FIG. 1A and FIG. 2.

TABLE 3

Relative heights of the exemplary rotors shown in FIG. 3.

| Rotor | Height |
| --- | --- |
| Inner Front Rotor (326) | 48 cm |
| Outer Front Rotor (328) | 52 cm |
| Inner Middle Rotor (330) | 48 cm |
| Outer Back Rotor (332) | 53 cm |
| Inner Back Rotor (334) | 50 cm |

To address height differences in pilots, a variety of techniques may be used. In some embodiments, the seat is adjustable so that is can be raised or lowered depending upon the pilot's height. For example, a shorter pilot may not be able to see over the side wall or front wall and an adjustable seat would be raised. Conversely, an adjustable seat may be lowered for a taller pilot so that a taller pilot's head remains below the top of the headrest and/or their shoulder is substantially the same height as the top edge of the side wall. Other techniques, including booster seats for shorter pilots or swappable/removable seats, may also be employed.

The multicopter shown here is merely exemplary and is not intended to be limiting. For example, this multicopter does not have a windshield but other embodiments may include a windshield for comfort and/or protection. In some embodiments, the windshield is also used as a heads up display. In some embodiments, the cockpit is enclosed so that the pilot is protected from all sides or angles.

Figure 4:
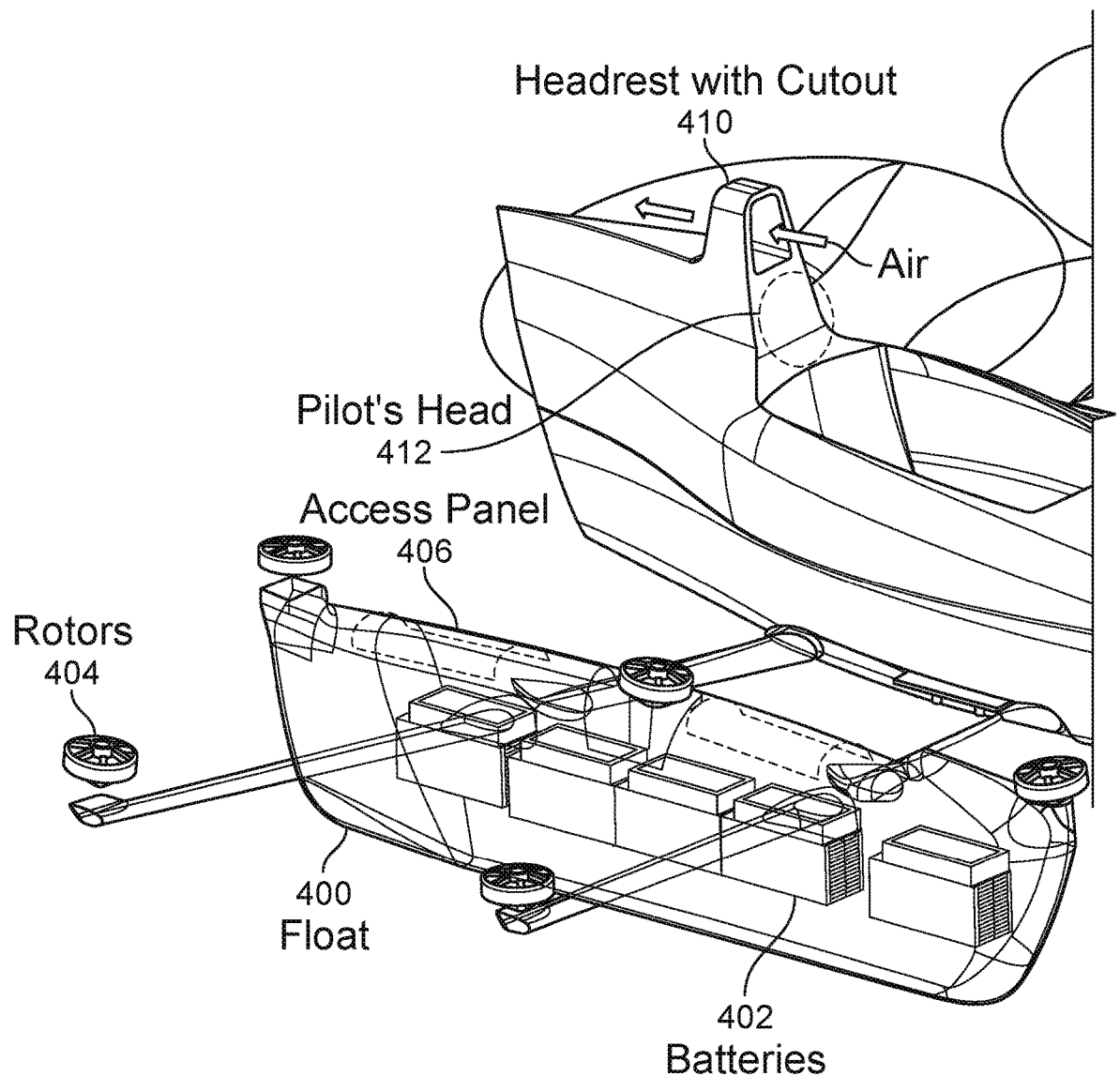
FIG. 4 is a diagram illustrating an embodiment of a float which includes batteries and a headrest with a cutout.

FIG. 4 is a diagram illustrating an embodiment of a float which includes batteries and a headrest with a cutout. For clarity, the blades of the rotors on this side of multicopter are not shown. In this example, the float (400) includes 5 batteries (402), one for each rotor on this side of the multicopter. By having an independent battery for each rotor, multiple rotors will not fail if a single battery goes out.

Storing the batteries in the float may be desirable for safety reasons. In the event of a hard landing (assuming the aircraft does not flip over), the batteries will strike the ground before the pilot will, absorbing much of the kinetic energy of the impact and reducing impact force on the pilot. Similarly, in the event of a rollover, the batteries in the floats help to absorb energy to protect the pilot. For example, as the batteries decelerate, some of the structure in the floats is broken and/or sacrificed in order to protect the pilot.

In some embodiments, the float (400) is carbon based (e.g., carbon fiber), which is relatively lightweight and permits a desired shape to be achieved. For example, if the floats were instead made of an inflatable material, it would be more difficult to achieve the desired (e.g., air foil) shape described above. Carbon related materials therefore can achieve the desired shape, while having sufficient or adequate thermal conductivity to dissipate the heat from the batteries (e.g., because the floats must have a variety of properties, including the ability to dissipate heat from the batteries so that the batteries do not overheat). In some embodiments, to help with thermal conductivity, the walls of the float are kept relatively thin (e.g., thick enough to achieve some desired structural performance, but thin enough to sufficiently dissipate heat).

Placing the batteries in the float also keeps the pilot safe in the event the batteries fail and/or overheat. Some other aircraft configurations may place the batteries under the pilot's seat, which is dangerous because a battery failure can include the battery catching on fire, emitting noxious fumes, and/or exploding. Even a battery which becomes hot but does not fail could be uncomfortable for the pilot.

To access the batteries and other components inside the float, the float has two access panels (406) on the top surface of the float. During normal operation when access to the interior of the floats is not needed, the access panels are closed to protect the batteries and other components inside the float from water, dirt, debris, etc. When access to the interior of the float is desired, the access panel(s) may be opened. In various embodiments, the access panels may have a variety of configurations or tops, such as a completely removable lid, a hinged lid, a sliding cover, etc. In various embodiments, the access panels are held in place using an adhesive, screws, locks, etc. For simplicity and readability, only two access panels are shown here. An actual prototype of the aircraft includes four access panels per float.

The headrest (410) in this example contains a cutout. For context, the pilot's head when seated is shown with a dotted circle (412) and as shown the cutout is located above the expected position of the pilot's head. The cutout in the headrest reduces the drag when the multicopter is flying forward because it permits airflow through the cutout while still protecting the pilot should the multicopter flip over. In contrast, air cannot pass through a solid headrest (see, e.g., FIG. 3) when the multicopter is flying forward which will result in higher drag or wind resistance.

Returning briefly to FIGS. 1B-1E, additional techniques to further improve safety would be desirable. The following figures describe some such examples where the rotors which surround the inner middle rotor are positioned so they form a protective barrier around the inner middle rotor before the inner middle rotor is started.

Figure 5A:
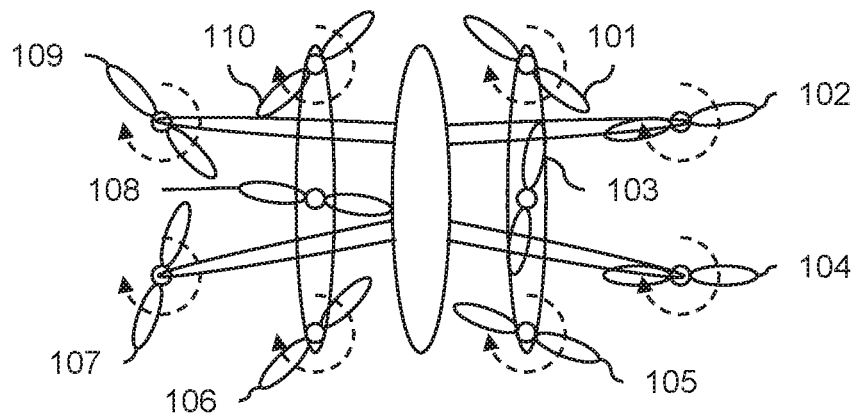
FIG. 5A is a diagram illustrating an embodiment of rotors in a random position.

FIG. 5A is a diagram illustrating an embodiment of rotors in a random position. In the example shown, the rotors are all in different and/or random positions. The exterior or edge rotors (101-102, 104-107, and 109-110) are rotated so that they move from the random positions shown to a tip-to-tip position so that they form a protective barrier of sorts around the inner middle rotors (103 and 108). The following figure shows an example of this.

Figure 5B:
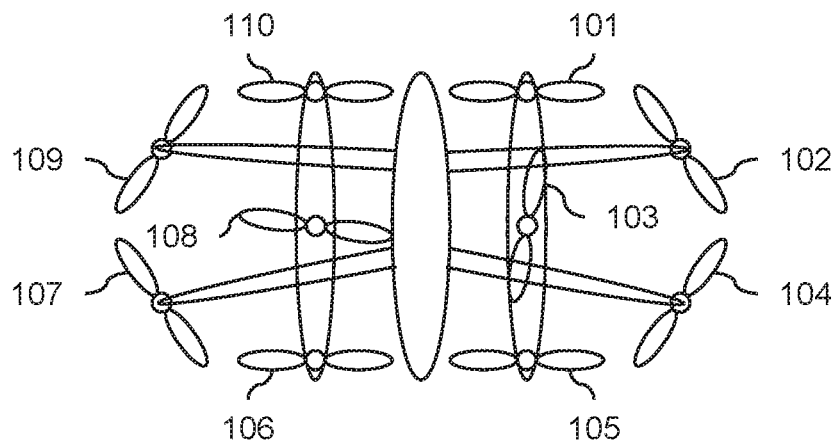
FIG. 5B is a diagram illustrating an embodiment of the edge rotors positioned tip-to-tip to form a protective barrier around the inner middle rotors.

FIG. 5B is a diagram illustrating an embodiment of the edge rotors positioned tip-to-tip to form a protective barrier around the inner middle rotors. As shown here, the edge or exterior rotors (101-102, 104-107, and 109-110) have been rotated so that they are positioned tip-to-tip and form a protective barrier or perimeter around the inner middle rotors (103 and 108). This can further help (e.g., in addition to the examples shown in FIGS. 1B-1E) to prevent people or objects from being struck when the rotors start up. For example, in some cases, the multicopter is taking off from an unsecured area where there is no fence to keep children or animals from getting close to the multicopter at takeoff and this feature may make the multicopter safer.

Figure 5C:
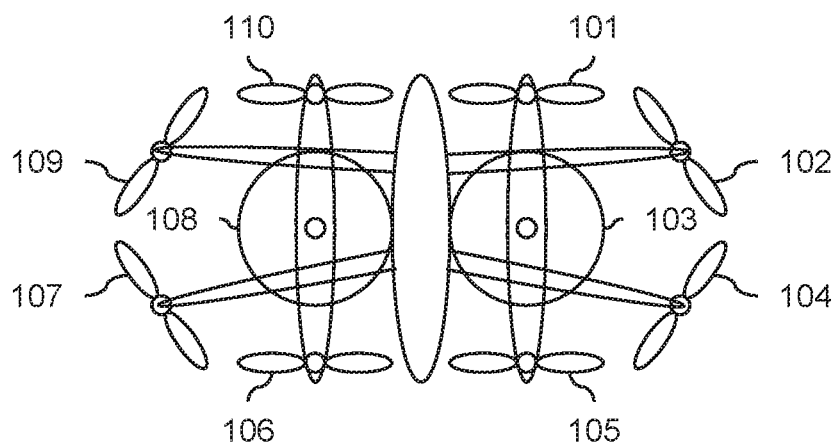
FIG. 5C is a diagram illustrating an embodiment of the inner middle rotors starting up while the edge rotors form a protective barrier around the inner middle rotors.

FIG. 5C is a diagram illustrating an embodiment of the inner middle rotors starting up while the edge rotors form a protective barrier around the inner middle rotors. With the edge or exterior rotors (101-102, 104-107, and 109-110) forming a barrier, the inner middle rotors (103 and 108) start rotating with less likelihood of striking someone or something.

In some embodiments, this positioning of the edge or exterior rotors (e.g., to go from FIG. 5A to FIG. 5B) occurs at the end of the flight where the rotors are stopped in the position shown so that the protective barrier is already formed and/or in-place when the inner middle rotors are ready to start up at the beginning of the next flight. Alternatively, the positioning of the edge or exterior rotors occurs at the beginning of a flight. For example, the edge or exteriors rotors may be positioned using a low speed and/or low torque so that if a rotor strikes someone or something, neither the rotor nor the thing being struck will be hurt or damaged.

The following figure describes the above examples more generally and/or formally in a flowchart.

Figure 6:
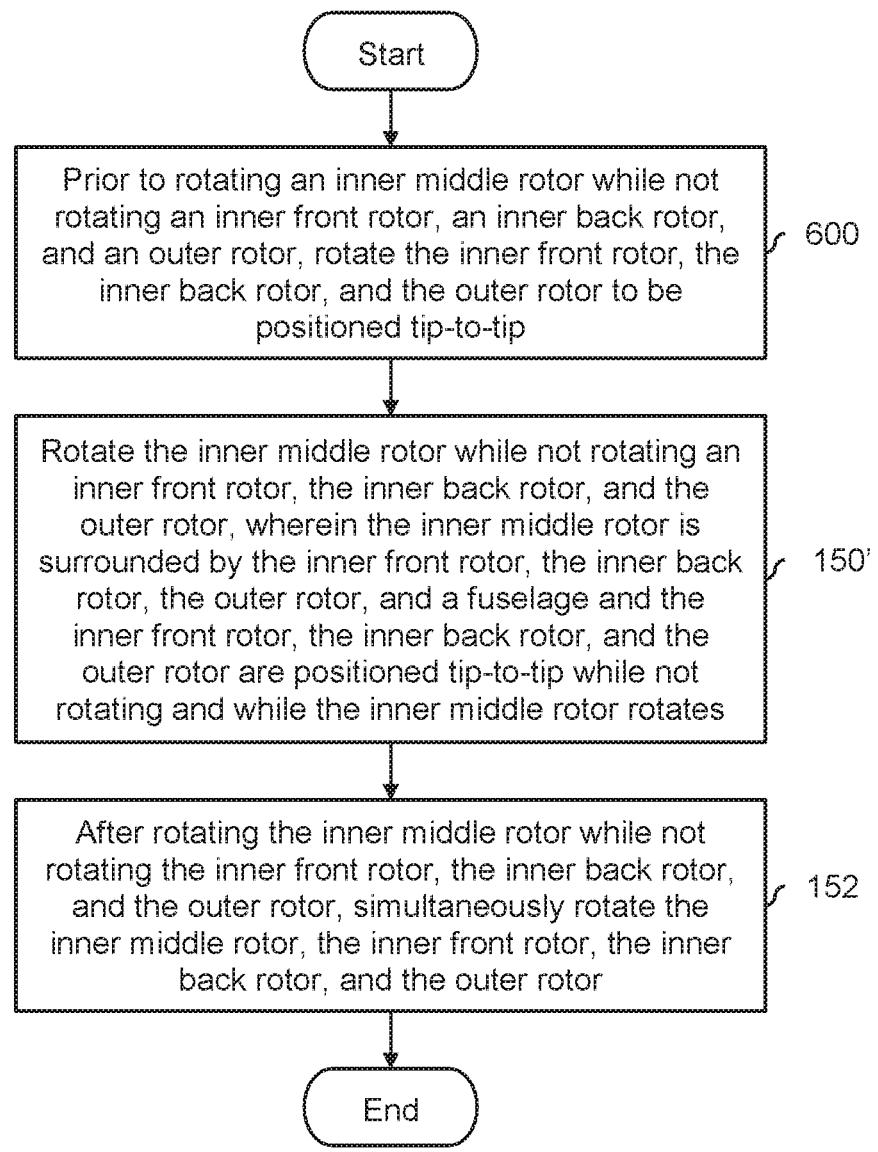
FIG. 6 is a flowchart illustrating an embodiment of a process to turn on rotors with some of the rotors positioned tip-to-tip.

FIG. 6 is a flowchart illustrating an embodiment of a process to turn on rotors with some of the rotors positioned tip-to-tip. FIG. 6 is related to FIG. 1E and for convenience the same or similar references numbers are used to show related steps.

At 600, prior to rotating an inner middle rotor while not rotating an inner front rotor, an inner back rotor, and an outer rotor, the inner front rotor, the inner back rotor, and the outer rotor are rotated to be positioned tip-to-tip. See, for example, the transition from FIG. 5A where rotors 101-102, 104-107, and 109-110 are in random positions to FIG. 5B where those rotors have rotated to be tip-to-tip. As described above, this positioning or rotating may occur at the end of the previous flight (e.g., step 600 occurs at an end of a first flight and step 150' occurs during a second flight where the second flight occurs after the first flight) or during a same flight (e.g., step 600 and step 150' occur during a same flight).

At 150', the inner middle rotor is rotated while an inner front rotor, the inner back rotor, and the outer rotor are not rotated, wherein the inner middle rotor is surrounded by the inner front rotor, the inner back rotor, and the outer rotor, and a fuselage and the inner front rotor, the inner back rotor, and the outer rotor are positioned tip-to-tip while not rotating and while the inner middle rotor rotates. See, for example FIG. 5C.

At 152, after rotating the inner middle rotor while not rotating the inner front rotor, the inner back rotor, and the outer rotor, the inner middle rotor, the inner front rotor, the inner back rotor, and the outer rotor are simultaneously rotated. For example, in FIG. 5C, the stationary rotors (101-102, 104-107, and 109-110) would begin rotating (not shown therein).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   rotating an inner middle rotor while not rotating an inner front rotor, an inner back rotor, and an outer rotor, wherein the inner middle rotor is surrounded by the inner front rotor, the inner back rotor, the outer rotor, and a fuselage; and
   after rotating the inner middle rotor while not rotating the inner front rotor, the inner back rotor, and the outer rotor, simultaneously rotating the inner middle rotor, the inner front rotor, the inner back rotor, and the outer rotor.

2. The method recited in claim 1, wherein:
   the method further includes: prior to rotating an inner middle rotor while not rotating an inner front rotor, an inner back rotor, and an outer rotor, rotating the inner front rotor, the inner back rotor, and the outer rotor to be positioned tip-to-tip; and
   the inner front rotor, the inner back rotor, and the outer rotor are positioned tip-to-tip while not rotating and while the inner middle rotor rotates.

3. The method recited in claim 1, wherein:
   the method further includes: prior to rotating the inner middle rotor while not rotating the inner front rotor, the inner back rotor, and the outer rotor, rotating the inner front rotor, the inner back rotor, and the outer rotor to be positioned tip-to-tip at an end of a first flight; and
   the inner front rotor, the inner back rotor, and the outer rotor are positioned tip-to-tip while not rotating and while the inner middle rotor rotates during a second flight, wherein the second flight occurs after the first flight.

4. The method recited in claim 1, wherein:
   the method further includes: prior to rotating the inner middle rotor while not rotating the inner front rotor, the inner back rotor, and the outer rotor, rotating the inner front rotor, the inner back rotor, and the outer rotor to be positioned tip-to-tip; and
   the inner front rotor, the inner back rotor, and the outer rotor are positioned tip-to-tip while not rotating and while the inner middle rotor rotates during a same flight as when the inner front rotor, the inner back rotor, and the outer rotor are rotated to be positioned tip-to-tip.

5. A computer program product, the computer program product being embodied in a non-transitory computer readable storage medium and comprising computer instructions for:
   rotating an inner middle rotor while not rotating an inner front rotor, an inner back rotor, and an outer rotor, wherein the inner middle rotor is surrounded by the inner front rotor, the inner back rotor, the outer rotor, and a fuselage; and
   after rotating the inner middle rotor while not rotating the inner front rotor, the inner back rotor, and the outer rotor, simultaneously rotating the inner middle rotor, the inner front rotor, the inner back rotor, and the outer rotor.

6. The computer program product recited in claim 5, wherein:
   the computer program product further includes computer instructions for: prior to rotating an inner middle rotor while not rotating an inner front rotor, an inner back rotor, and an outer rotor, rotating the inner front rotor, the inner back rotor, and the outer rotor to be positioned tip-to-tip; and
   the inner front rotor, the inner back rotor, and the outer rotor are positioned tip-to-tip while not rotating and while the inner middle rotor rotates.

7. The computer program product recited in claim 5, wherein:
   the computer program product further includes computer instructions for: prior to rotating the inner middle rotor while not rotating the inner front rotor, the inner back rotor, and the outer rotor, rotating the inner front rotor, the inner back rotor, and the outer rotor to be positioned tip-to-tip at an end of a first flight; and
   the inner front rotor, the inner back rotor, and the outer rotor are positioned tip-to-tip while not rotating and while the inner middle rotor rotates during a second flight, wherein the second flight occurs after the first flight.

8. The computer program product recited in claim 5, wherein:
   the computer program product further includes computer instructions for: prior to rotating the inner middle rotor while not rotating the inner front rotor, the inner back rotor, and the outer rotor, rotating the inner front rotor, the inner back rotor, and the outer rotor to be positioned tip-to-tip; and
   the inner front rotor, the inner back rotor, and the outer rotor are positioned tip-to-tip while not rotating and while the inner middle rotor rotates during a same flight as when the inner front rotor, the inner back rotor, and the outer rotor are rotated to be positioned tip-to-tip.

* * * * *

UNITED STATES PATENT AND TRADEMARK OFFICE
CERTIFICATE OF CORRECTION

| | | |
|---|---|---|
| PATENT NO. | : 11,465,736 B2 | Page 1 of 1 |
| APPLICATION NO. | : 16/703135 | |
| DATED | : October 11, 2022 | |
| INVENTOR(S) | : Todd Reichert, Cameron Robertson and Mark Johnson Cutler | |

It is certified that error appears in the above-identified patent and that said Letters Patent is hereby corrected as shown below:

In the Specification

In Column 10, Line(s) 41, after "that", delete "is" and insert --it--, therefor.

Signed and Sealed this
Thirtieth Day of May, 2023

Katherine Kelly Vidal
*Director of the United States Patent and Trademark Office*